US012443321B1

(12) United States Patent
Huang et al.

(10) Patent No.: US 12,443,321 B1
(45) Date of Patent: Oct. 14, 2025

(54) TOUCHPAD MODULE

(71) Applicant: Primax Electronics Ltd., Taipei (TW)

(72) Inventors: Wei-Chiang Huang, Taipei (TW);
Wei-Ping Chan, Taipei (TW);
Hsueh-Chao Chang, Taipei (TW);
Chieh-Hung Hsieh, Taipei (TW);
Chia-Ming Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/798,190

(22) Filed: Aug. 8, 2024

(30) Foreign Application Priority Data

Jul. 19, 2024 (TW) ................................. 113127182

(51) Int. Cl.
G06F 3/044 (2006.01)
G06F 1/18 (2006.01)
G06F 3/0354 (2013.01)

(52) U.S. Cl.
CPC ............ G06F 3/0447 (2019.05); G06F 1/183 (2013.01); G06F 3/03547 (2013.01); G06F 3/044 (2013.01)

(58) Field of Classification Search
CPC .... G06F 3/0447; G06F 1/183; G06F 3/03547; G06F 3/044
See application file for complete search history.

(56) References Cited

U.S. PATENT DOCUMENTS 5,854,625 A * 12/1998 Frisch ................. G06F 3/04142
345/173
6,058,000 A * 5/2000 Koenck .............. G06K 17/0022
361/91.1
2017/0329426 A1* 11/2017 Han ..................... G06F 3/03547

FOREIGN PATENT DOCUMENTS

CN 216052809 U * 3/2022

OTHER PUBLICATIONS

Machine translation of CN 216052809 U (Year: 2022).*

* cited by examiner

Primary Examiner — Patrick N Edouard
Assistant Examiner — Joseph P Fox
(74) Attorney, Agent, or Firm — KIRTON McCONKIE; Evan R. Witt

(57) ABSTRACT

A touchpad module includes a support member, a printed circuit board assembly (PCBA) and an elastic member. The support member has a protruding portion. The printed circuit board assembly is located over the support member and includes a capacitive sensing element corresponding to the protruding portion of the support member. The elastic member is disposed between the support member and the printed circuit board assembly. When the touchpad module is not pressed, a spacing between the capacitive sensing element and the protruding portion is smaller than a thickness of the elastic member.

9 Claims, 6 Drawing Sheets

TOUCHPAD MODULE

FIELD OF THE INVENTION

The present invention relates to a touchpad module, and in particular, to a capacitive-type pressure sensing touchpad module.

BACKGROUND OF THE INVENTION

Some electronic devices currently on the market are equipped with touchpad modules. The user's finger can slide on the touchpad module to move the cursor on the screen of the electronic device, and can also press the touchpad module to cause the electronic device to perform a specific function. In this way, the user does not need to carry and install an additional mouse.

Generally, the touchpad module usually uses a piezoelectric, resistive or capacitive sensor so that the touchpad module has a pressure sensing function. However, how to improve the sensitivity of the touchpad module when it is pressed has always been a technical issue in this field.

SUMMARY OF THE INVENTION

The present invention provides a touchpad module, which includes a support member, a printed circuit board assembly (PCBA) and an elastic member. The support member has a protruding portion. The printed circuit board assembly is located over the support member and includes a capacitive sensing element corresponding to the protruding portion of the support member. The elastic member is disposed between the support member and the printed circuit board assembly. When the touchpad module is not pressed, a spacing between the capacitive sensing element and the protruding portion is smaller than a thickness of the elastic member.

In some embodiments of the present invention, the support member defines an elastic arm region, and the elastic member is disposed between the elastic arm region of the support member and the printed circuit board assembly.

In some embodiments of the present invention, the touchpad module further includes a jig, located beneath the support member, in which the jig has an opening, and the elastic arm region of the support member corresponds to the opening and is suspended above the opening.

In some embodiments of the present invention, when the touchpad module is not pressed, the spacing between the capacitive sensing element and the protruding portion is less than or equal to 0.5 mm, and a thickness of the elastic member is greater than 0.5 mm.

In some embodiments of the present invention, the spacing between the capacitive sensing element and the protruding portion is less than a thickness of the support member.

In some embodiments of the present invention, a thickness of the protruding portion of the support member is substantially the same as a thickness of a portion of the support member other than the protruding portion.

In some embodiments of the present invention, a width of the protruding portion is greater than a width of the elastic member.

In some embodiments of the present invention, the printed circuit board assembly further includes at least one shielding layer embedded in the printed circuit board assembly, and a vertical projection of the capacitive sensing element is located within a vertical projection of the at least one shielding layer.

In some embodiments of the present invention, the printed circuit board assembly further includes a ground layer separated from the at least one shielding layer, and the at least one shielding layer is between the ground layer and the capacitive sensing element.

In some embodiments of the present invention, the touchpad module further includes a vibration element, in which the support member has a through opening separated from the protruding portion, and the vibration element is disposed in the through opening of the support member.

BRIEF DESCRIPTION OF THE DRAWINGS

Aspects of the present invention are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
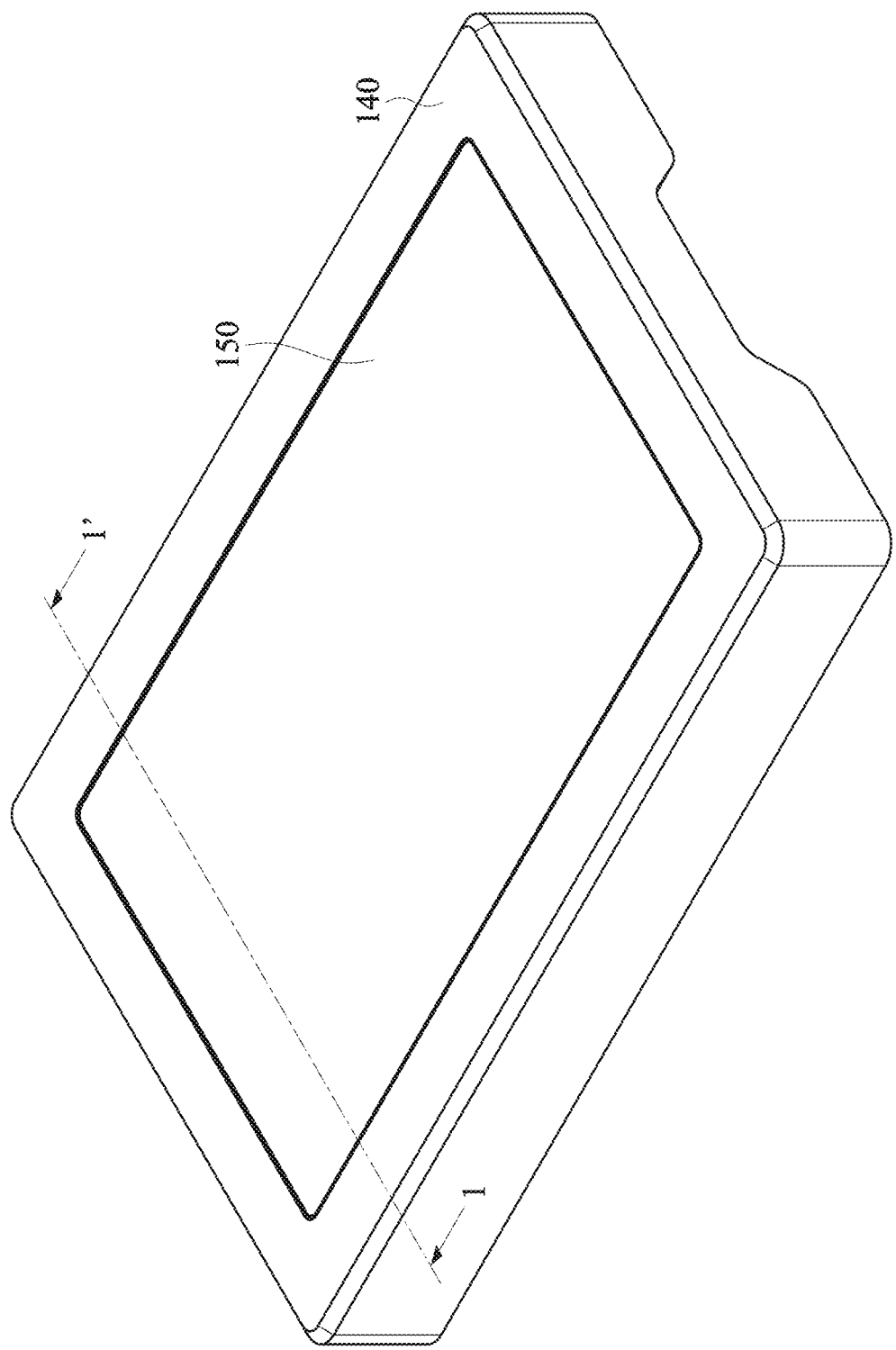
FIG. 1 is an appearance diagram of a touchpad module according to an embodiment of the present invention.

The advantages and features of the present invention and the method for achieving the same will be described in more detail with reference to exemplary embodiments and accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in the prior art, how to improve the sensitivity of the touchpad module when it is pressed has always been a technical issue in this field. Accordingly, the present invention provides a touchpad module, which includes a support member having a protruding portion, a printed circuit board assembly (PCBA) including a capacitive sensing element corresponding to the protruding portion, and an elastic member disposed between the support member and the printed circuit board assembly. The inventor found that since a capacitive sensing value is inversely proportional to a distance, the smaller the spacing between the support member and the capacitive sensing element (hereinafter referred to as the "spacing"), the more advantageous it is for detecting the change in the capacitive sensing value (when the touchpad module is not pressed and after it is pressed), making the touchpad module has higher sensitivity when pressed; however, the smaller the spacing, it is not easy to achieve in the manufacturing process (generally, the spacing depends on a thickness of the elastic member, but there is a processing limit on manufacturing of the elastic member, so it fails to manufacture an extremely thin elastic member), and if the touchpad module is equipped with an additional vibration element, a vibration amplitude of the touchpad module is too small and cannot achieve a required vibration effect. Therefore, the present invention uses the design of the protruding portion of the support member to control the spacing between the protruding portion and the capacitive sensing element, so that the touchpad module has high sensitivity when pressed. Since the spacing is not determined by the thickness of the elastic member in the present invention, the touchpad module can have high sensitivity when pressed regardless of the thickness of the elastic member, and it is not limited by the processing limit on manufacturing of the elastic member and the required vibration effect of the touchpad module. Various embodiments of the touchpad module of the present invention will be described in detail below.

Figure 2:
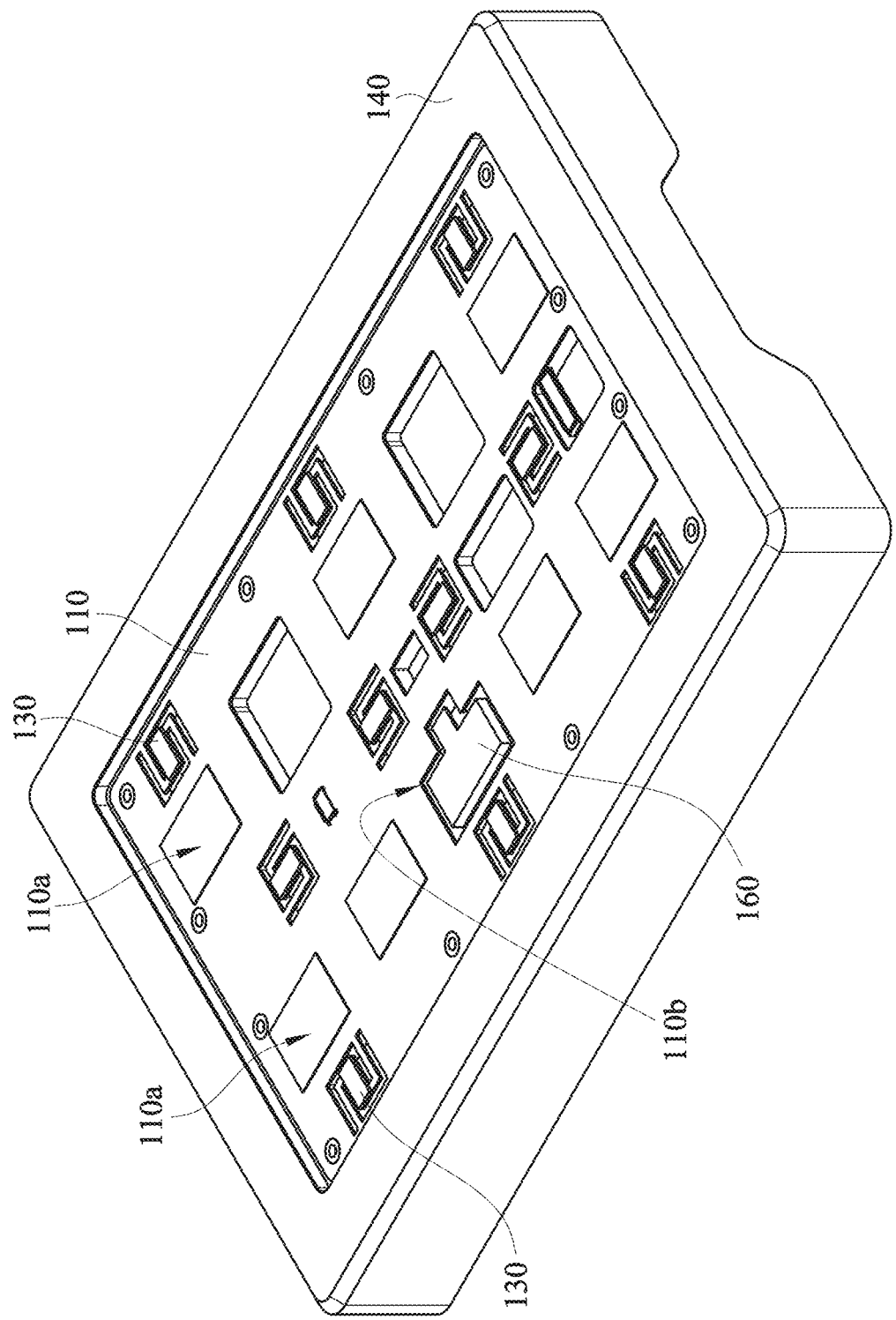
FIG. 2 is a perspective view of a support member, an elastic member, a jig and a vibration element according to an embodiment of the present invention.
Figure 3:
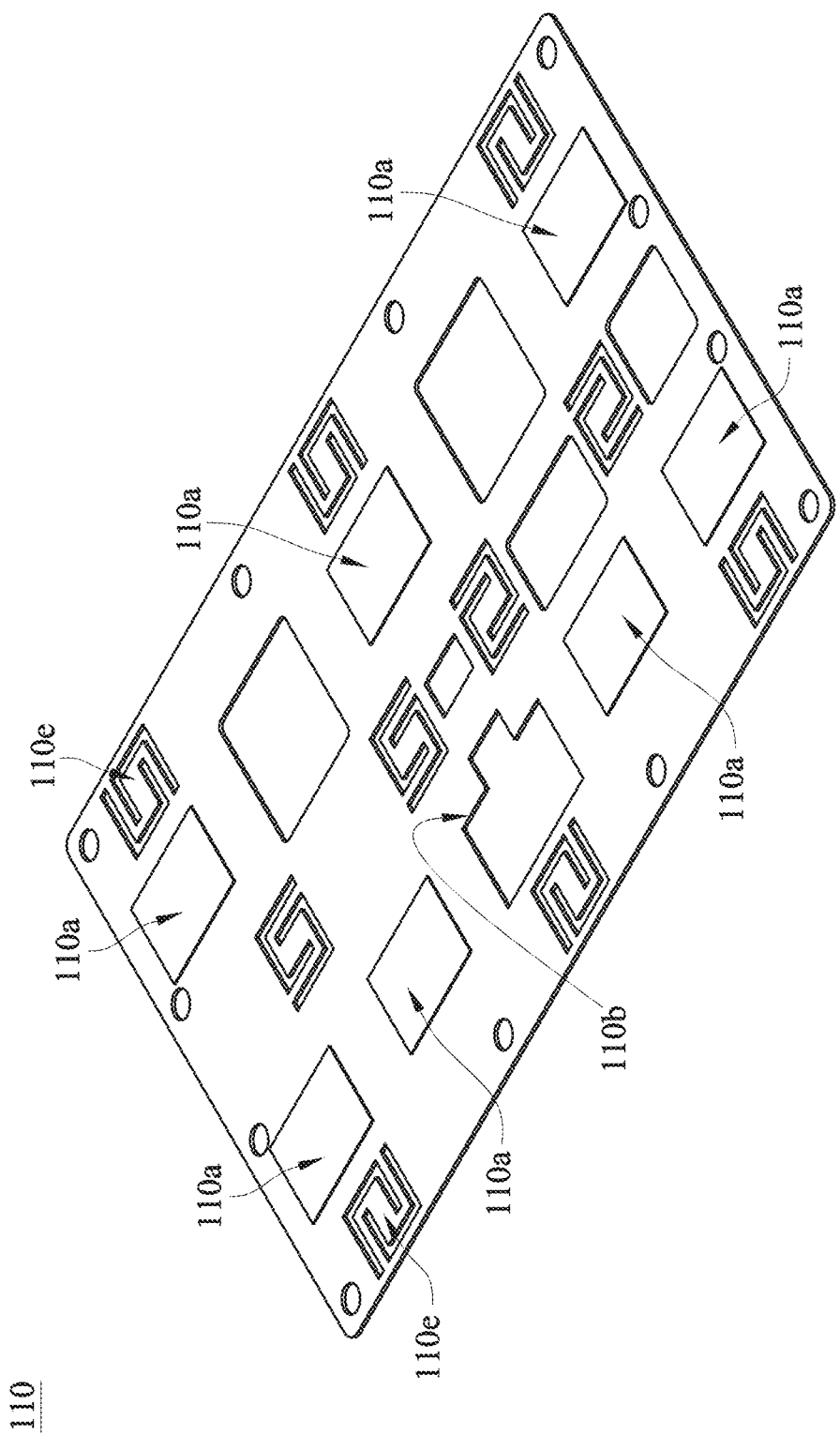
FIG. 3 is a perspective view of a support member according to an embodiment of the present invention.
Figure 4:
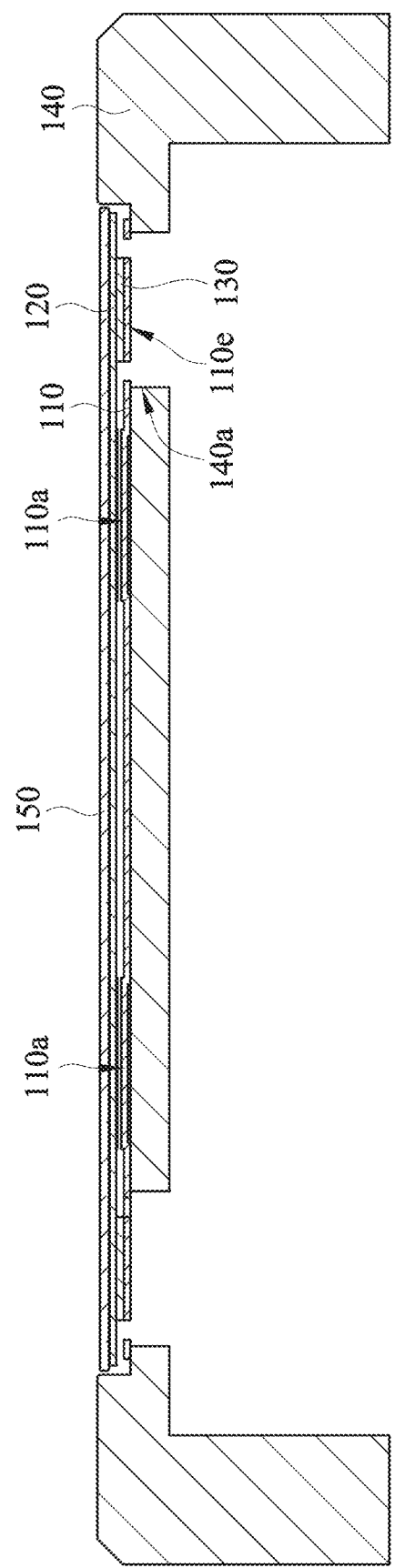
FIG. 4 is a cross-sectional view along line 1-1' of FIG. 1.
Figure 5:
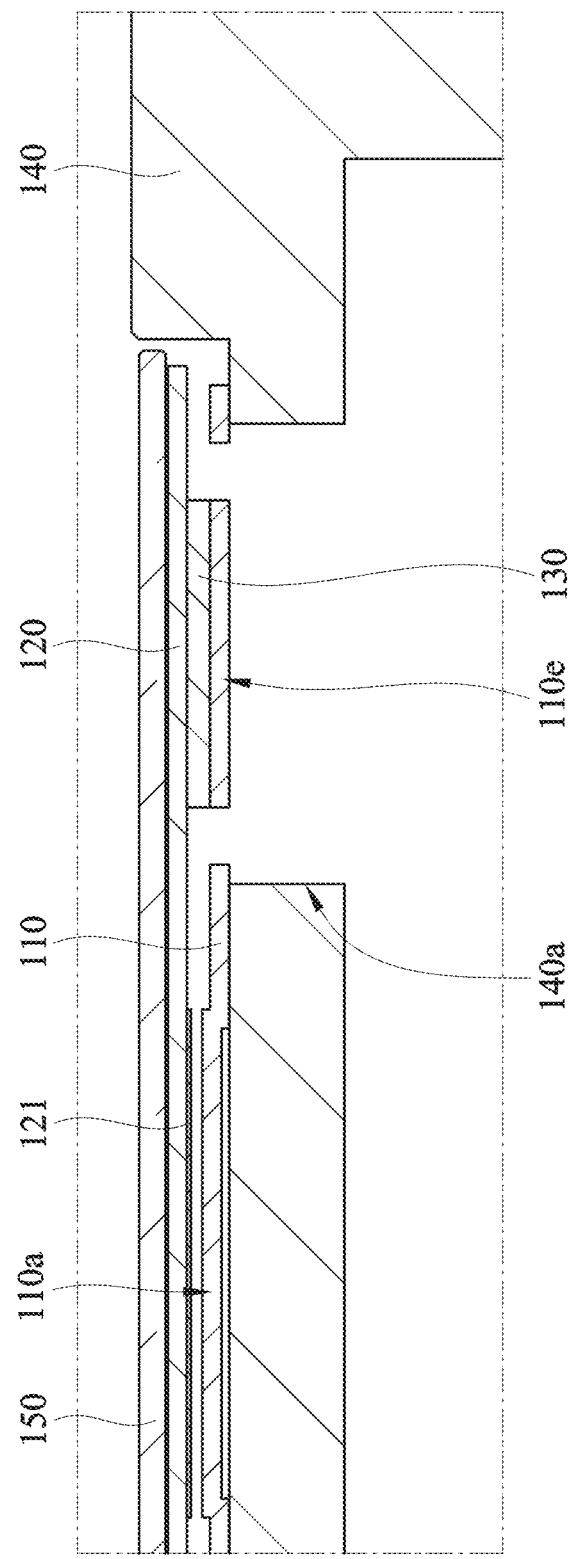
FIG. 5 is a partial enlarged view of FIG. 4.

FIG. 1 is an appearance diagram of a touchpad module according to an embodiment of the present invention. FIG. 2 is a perspective view of a support member, an elastic member, a jig and a vibration element according to an embodiment of the present invention. FIG. 3 is a perspective view of a support member according to an embodiment of the present invention. FIG. 4 is a cross-sectional view along line 1-1' of FIG. 1. FIG. 5 is a partial enlarged view of FIG. 4. As shown in FIGS. 1 to 5, the touchpad module includes a support member 110, a printed circuit board assembly (PCBA) 120 and an elastic member 130.

As shown in FIGS. 2 to 5, the support member 110 has a protruding portion 110a. In some embodiments, the support member 110 is a metal piece, such as an iron piece. In some embodiments, as shown in FIGS. 4 and 5, a thickness of the protruding portion 110a of the supporting member 110 is substantially the same as a thickness of a portion of the supporting member 110 other than the protruding portion 110a. In some embodiments, the protruding portion 110a of the support member 110 is made by an embossing process or another suitable process.

As shown in FIGS. 4 and 5, the printed circuit board assembly 120 is located over the support member 110 and includes a capacitive sensing element 121 corresponding to the protruding portion 110a of the support member 110. In some embodiments, a controller (not shown) is disposed on a lower surface of the printed circuit board assembly 120. The change in the capacitance sensing value detected by the capacitance sensing element 121 can be transmitted to the controller (e.g., a microcontroller unit (MCU)).

As shown in FIGS. 4 and 5, the elastic member 130 is disposed between the support member 110 and the printed circuit board assembly 120, and is adjacent to the protruding portion 110a and the capacitive sensing element 121. In some embodiments, as shown in FIGS. 3 to 5, the support member 110 has a hollow region, which is used to define an elastic arm region 110e, and the elastic member 130 is disposed between the elastic arm region 110e of the support member 110 and the printed circuit board assembly 120. In some embodiments, as shown in FIGS. 2, 4 and 5, a width of the protruding portion 110a is greater than a width of the elastic member 130.

When the touchpad module is not pressed, a spacing between the capacitive sensing element 121 and the protruding portion 110a is less than a thickness of the elastic member 130. In some embodiments, when the touchpad module is not pressed, the spacing between the capacitive sensing element 121 and the protruding portion 110a is less than or equal to 0.5 mm (e.g., 0.45 mm, 0.40 mm, 0.35 mm, 0.30 mm, or any value between two values), and the thickness of the elastic member 130 is greater than 0.5 mm (e.g., 0.55 mm, 0.60 mm, 0.65 mm, 0.70 mm, 0.75 mm or 0.80 mm or any value between two values). In some embodiments, as shown in FIGS. 4 and 5, the spacing between the capacitive sensing element 121 and the protruding portion 110a is less than a thickness of the support member 110.

In some embodiments, as shown in FIGS. 1, 2, 4 and 5, the touchpad module further includes a jig 140 located beneath the support member 110 and is configured to carry the support member 110 and the printed circuit board assembly 120. In some embodiments, the jig 140 has an opening 140a, and the elastic arm region 110e of the support member 110 corresponds to the opening 140a and is suspended above the opening 140a.

In some embodiments, as shown in FIGS. 1, 4 and 5, the touchpad module further includes a cover 150, which covers the printed circuit board assembly 120. In some embodiments, the cover 150 is made of glass or another suitable material.

In some embodiments, as shown in FIGS. 2 and 3, the touchpad module further includes a vibration element 160 (e.g., a motor). The support member 110 has a through opening 110b separated from the protruding portion 110a, and the vibration element 160 is disposed in the through opening 110b of the support member 110. In some embodiments, the vibration element 160 is disposed beneath the printed circuit board assembly 120. The vibration element 160 can provide the touchpad module with a vibration effect.

Figure 6:
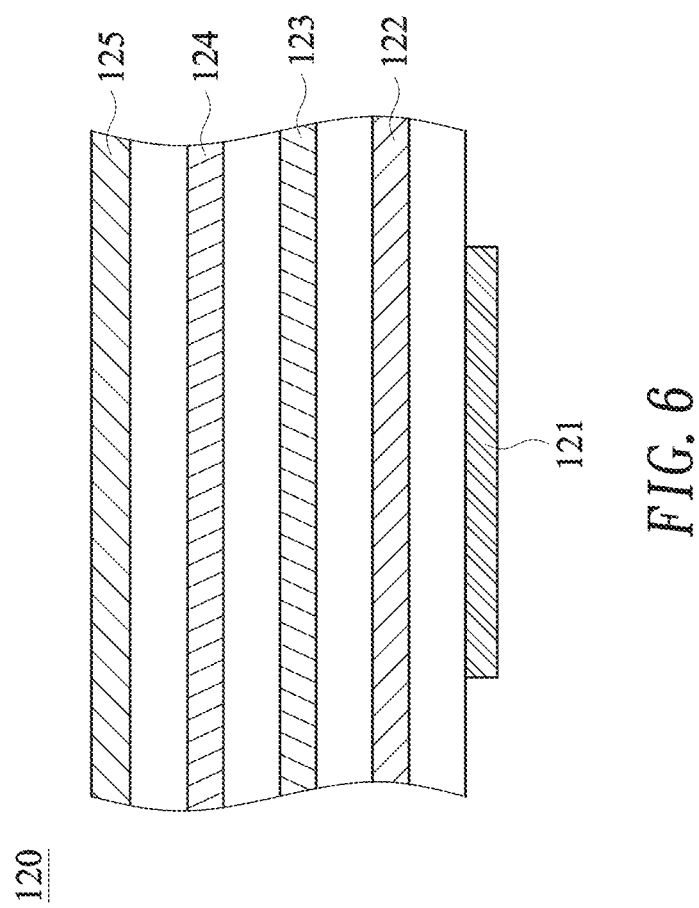
FIG. 6 is a cross-sectional view of a printed circuit board assembly according to an embodiment of the present invention.

FIG. 6 is a cross-sectional view of a printed circuit board assembly according to an embodiment of the present invention. In some embodiments, as shown in FIG. 6, the printed circuit board assembly 120 further includes at least one shielding layer 122 embedded in the printed circuit board assembly 120. In some embodiments, a vertical projection of the capacitive sensing element 121 is located within a vertical projection of the at least one shielding layer 122.

In some embodiments, the printed circuit board assembly 120 further includes a ground layer 123, which is separated from the at least one shielding layer 122. The at least one shielding layer 122 is between the ground layer 123 and the capacitive sensing element 121. Since the printed circuit board assembly includes the at least one shielding layer 122, it can shield stray capacitance (or called parasitic capacitance) between the capacitive sensing element 121 and the ground layer 123, and can also shield stray capacitance difference caused by expansion or contraction of the ground layer 123 due to temperature changes. Therefore, the sensitivity of the touchpad module when pressed can be effectively improved.

In some embodiments, the printed circuit board assembly 120 further includes a driving electrode layer 124 and a sensing electrode layer 125, which respectively have driving lines and scanning lines to provide touch functions. In some embodiments, the printed circuit board assembly 120 further includes a plurality of insulating layers (not labeled), which are disposed between two adjacent conductive layers. In some embodiments, as shown in FIG. 6, the insulating layers are disposed between the capacitive sensing element 121 and the shielding layer 122, between the shielding layer 122 and the ground layer 123, between the ground layer 123 and the driving electrode layer 124, and between the driving electrode layer 124 and the sensing electrode layer 125, respectively. However, the present invention is not limited to the embodiment shown in FIG. 6, and a number of layers of the printed circuit board assembly can be adjusted according to actual needs.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not intended to limit the scope of claims of the present invention.

What is claimed is:

1. A touchpad module, comprising:
a support member, having a protruding portion, wherein the support member defines an elastic arm region;
a printed circuit board assembly (PCBA), located over the support member and comprising a capacitive sensing element corresponding to the protruding portion of the support member; and
an elastic member, disposed between the elastic arm region of the support member and the printed circuit board assembly, wherein when the touchpad module is not pressed, a spacing between the capacitive sensing element and the protruding portion is smaller than a thickness of the elastic member.

2. The touchpad module of claim 1, further comprising:
a jig, located beneath the support member, wherein the jig has an opening, and the elastic arm region of the support member corresponds to the opening and is suspended above the opening.

3. The touchpad module of claim 1, wherein when the touchpad module is not pressed, the spacing between the capacitive sensing element and the protruding portion is less than or equal to 0.5 mm, and a thickness of the elastic member is greater than 0.5 mm.

4. The touchpad module of claim 1, wherein the spacing between the capacitive sensing element and the protruding portion is less than a thickness of the support member.

5. The touchpad module of claim 1, wherein a thickness of the protruding portion of the support member is the same as a thickness of a portion of the support member other than the protruding portion.

6. The touchpad module of claim 1, wherein a width of the protruding portion is greater than a width of the elastic member.

7. The touchpad module of claim 1, wherein the printed circuit board assembly further comprises at least one shielding layer embedded in the printed circuit board assembly, and a vertical projection of the capacitive sensing element is located within a vertical projection of the at least one shielding layer.

8. The touchpad module of claim 7, wherein the printed circuit board assembly further comprises a ground layer separated from the at least one shielding layer, and the at least one shielding layer is between the ground layer and the capacitive sensing element.

9. The touchpad module of claim 1, further comprising:
a vibration element, wherein the support member has a through opening separated from the protruding portion, and the vibration element is disposed in the through opening of the support member.

* * * * *